United States Patent [19]

Shellhause

[11] Patent Number: 4,955,458
[45] Date of Patent: Sep. 11, 1990

[54] BLIND ASSEMBLY OF PARKING BRAKE CABLE TO PARKING BRAKE LEVER

[75] Inventor: Ronald L. Shellhause, Vandalia, Ohio

[73] Assignee: General Motors Corporation, Detroit, Mich.

[21] Appl. No.: 342,604

[22] Filed: Apr. 20, 1989

Related U.S. Application Data

[63] Continuation of Ser. No. 117,120, Nov. 4, 1987, abandoned.

[51] Int. Cl.$^5$ ............................................. F16D 51/00
[52] U.S. Cl. ..................................... 188/2 D; 188/78; 188/106 A; 188/325
[58] Field of Search ............ 188/331, 78, 325, 106 R, 188/106 F, 106 A, 106 P, 2 D; 403/194, 195, 196, 197; 74/500.5, 502.4, 502.5, 502.6

[56] References Cited

U.S. PATENT DOCUMENTS

| | | | |
|---|---|---|---|
| 2,791,295 | 5/1957 | Kershner | 188/106 A |
| 3,064,767 | 11/1962 | Wieger | 188/79 |
| 3,173,516 | 3/1965 | Rigby | 188/79 |
| 3,517,779 | 6/1970 | Bolenbaugh | 188/329 |
| 4,267,746 | 5/1981 | Pruett | 188/2 D |
| 4,364,456 | 12/1982 | Colpaert | 188/106 A |
| 4,387,792 | 6/1983 | Imamura | 188/331 X |
| 4,407,167 | 10/1983 | Koukal et al. | 74/501 F |
| 4,753,325 | 6/1988 | Jaksic | 188/2 D |

Primary Examiner—Robert P. Olszewski
Assistant Examiner—Matthew C. Graham
Attorney, Agent, or Firm—Ernest E. Helms

[57] ABSTRACT

A drum brake assembly having a parking brake actuating lever is so arranged that the parking brake cable end may be assembled in a blind fashion to the end of the actuating lever. The cable is provided with an enlarged end or button. The cable and spring are inserted through a guide tube and pushed inwardly into the brake assembly with the guide tube or a combination of the guide tube in a separate spring guide placing the cable button in a alignment so that it is aimed at a funnel-like guide and retention member formed on the end of the parking brake actuating lever. Further axial movement of the parking brake cable and its enlarged end result in a camming action which moves the enlarged end upwardly through and beyond the slot after which it snaps back downwardly to be positioned to be able to apply cable tension forces to the parking brake actuating lever. The entire assembly may be made with the brake assembly in the completely assembled condition wherein the drum covers the brake mechanism so that the assembler, operator cannot either see or manipulate that cable end and the connection thereof with the end of the actuating lever. The arrangement also provides for sealing the opening in the drum brake backing plate through which the parking brake cable extends, and permits checking for full connection of the parking brake cable with the actuating lever before such assembly is completed.

1 Claim, 2 Drawing Sheets

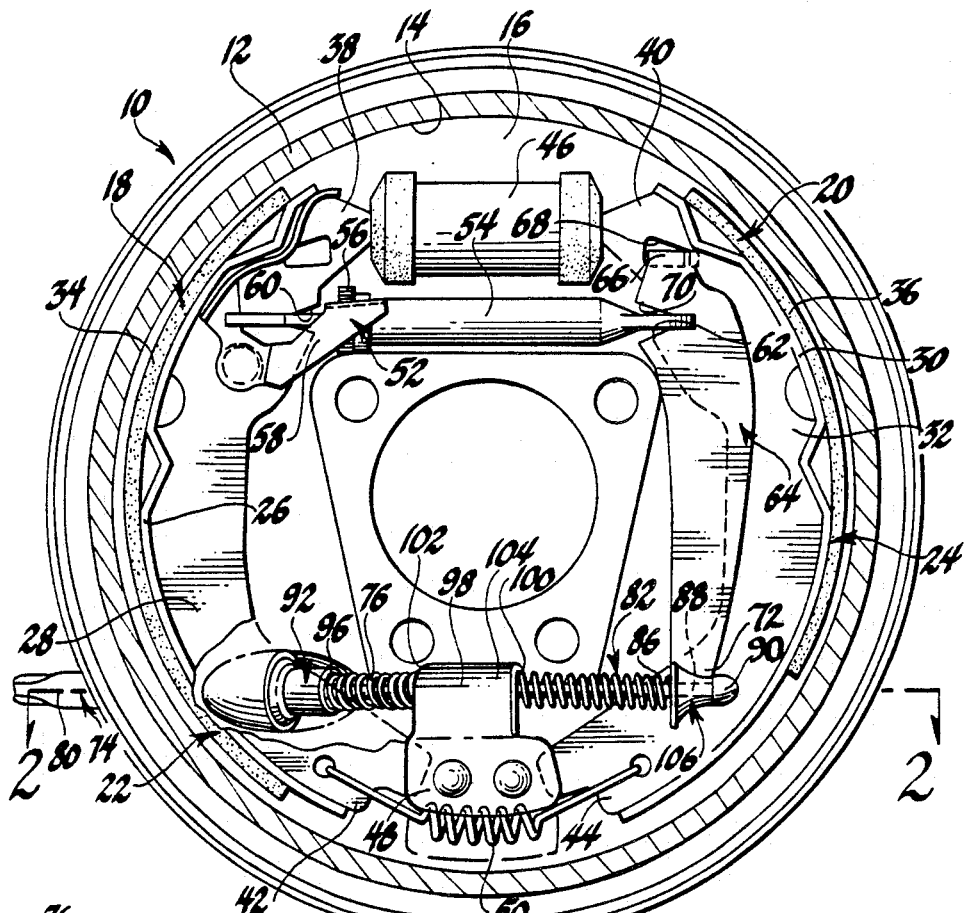
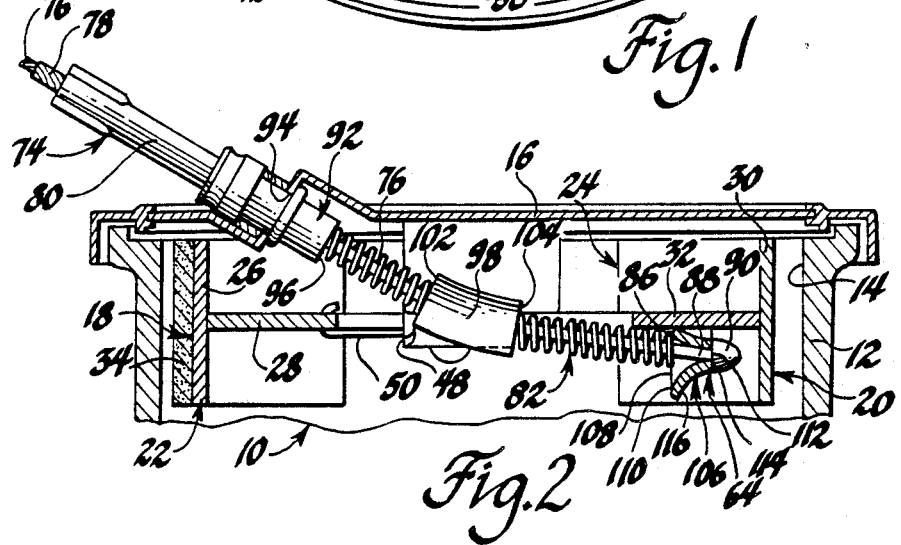

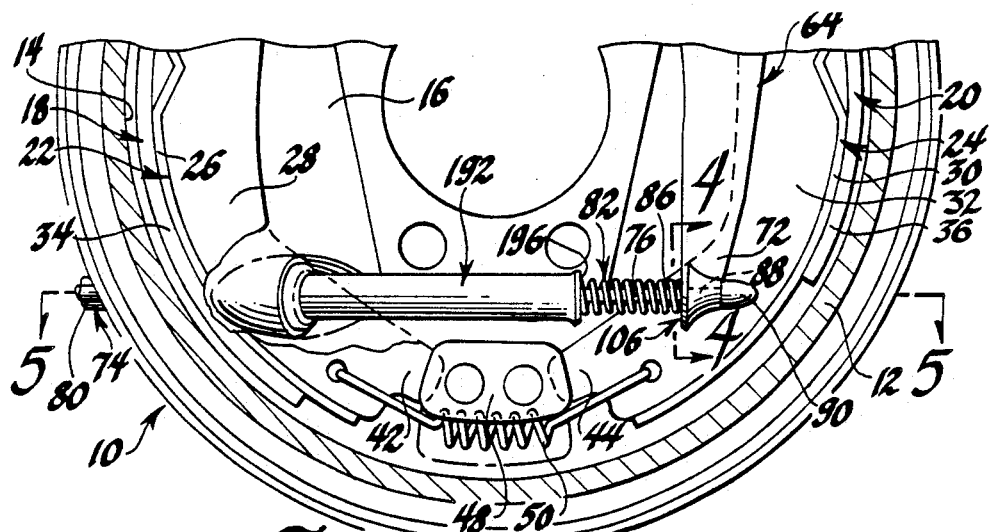
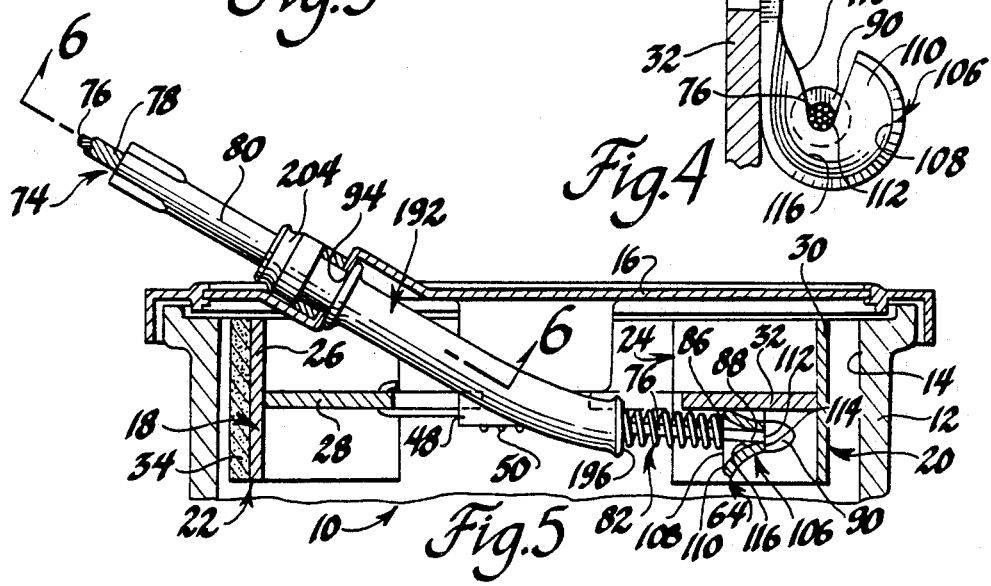
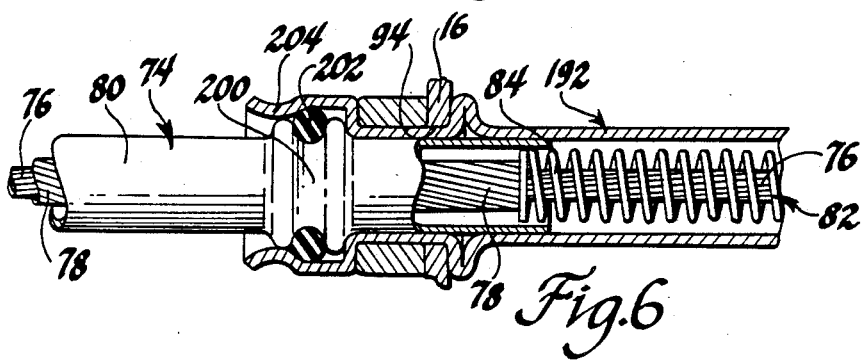

BLIND ASSEMBLY OF PARKING BRAKE CABLE TO PARKING BRAKE LEVER

This is a continuation of application Ser. No. 117,720 filed on Nov. 4, 1987 now abandoned.

The invention relates to a drum brake assembly having a parking brake mechanism including a parking brake lever connected to a parking brake cable so that when the cable is tensioned the drum brake is mechanically applied for parking brake purposes. It more particularly relates to such a drum brake in which the connection of the parking brake cable to the parking brake lever within the drum brake assembly is made in a blind manner, that is with the person assembling the cable to the lever being able to do so with the drum brake completely assembled on the vehicle.

The arrangement embodying the invention particularly permits the parking brake cable assembly to be inserted through the appropriate opening in the backing plate and to be guided and connected to an end of the parking brake actuating lever which is pivotally mounted on one of the brake shoe assemblies, without the assembly operator having to see the parts as they are approached and having to manipulate the parts so as to make the connection. In this arrangement the cable assembly is inserted through an apertured boss in the backing plate and pushed axially inward into the drum brake assembly. Since the drum is already in position as a part of the drum brake assembly, and therefore covers the brake shoes and closely approaches the backing plate and shield, the assembly is what is known as a blind assembly because the operator cannot see or manipulate each of the components being attached together within the drum brake assembly.

The arrangement is such that once the mechanism is installed and in position the assembly operator may pull outwardly on the parking brake cable and check that the cable is properly engaged with the end of the parking brake actuating lever. Once such engagement is confirmed, the assembly is completed by inserting a conduit assembly into snap-in engagement with a tube guide mounted in the backing plate opening, completing the cable assembly into the brake.

Typical drum brake parking brake actuating mechanisms have required that the parking brake cable be inserted through the backing plate opening and positioned in approximate relation to the connection point with the parking brake actuating lever which is pivotally mounted on one of the brake shoe assemblies. The assembly operator then has to maneuver the end of the parking brake cable and/or the parking brake actuating lever to make the connection. This therefore requires that such an assembly be done with the brake drum being off of the remainder of the brake assembly so that visual and manipulative capabilities are present to complete the assembly. A typical example of such a connection requiring this type of assembly is disclosed in U.S. Pat. No. 3,064,767 entitled "Brake Actuator" and issued Nov. 20, 1962.

It is a feature of the invention herein disclosed and claimed to provide mechanism which will permit a blind assembly of the cable end to the end of the parking brake actuating lever. More specifically, an arrangement is provided on the end of the parking brake actuating lever to receive the button end of the parking brake cable itself and cammingly guide the button end and the immediate portion of the cable through a slot and then permit the enlarged button-like end to move into its final engaged position, with the cable section extending through the guide and retention arrangement on the end of the actuating lever.

In order to accomplish this, the parking brake cable must be capable of being aimed or prepositioned so that it is able, upon axial assembling movement thereof, to engage the end of the parking brake actuator and then to accomplish the connection. This may be done by providing a tube guide mounted in an opening in the backing plate which extends from a laterally offset position at the backing plate to a laterally aligned position in spaced relation to the guide and retention means of the actuating lever so that when the parking brake cable is inserted and moved axially, the enlarged cable end section will be guided and connected as above noted. The parking brake actuating lever return spring is provided about the parking brake cable and will also act as a guide for the cable and its enlarged button-like end, particularly throughout the space between the end of the tube guide and the point at which the cable enlarged end is received by the guide and retention means. In one arrangement, the tube guide extends through much of the distance between the opening in the backing plate in which it is mounted and the actuating lever guide and retention means. In this instance it is advantageous to so curve the tube guide as to position it so as to aim the parking brake cable end properly for blind assembly, as above noted.

In another embodiment, the tube guide is a relatively short tube guide, terminating just inside the backing plate. With this arrangement it is preferred that a spring guide is also provided, the spring guide being secured to the backing plate and having an open passage way therethrough which may receive, both the spring and the parking brake cable, including its enlarged end, therethrough. The spring guide is so positioned that one end is in alignment with the terminus of the short tube guide near the backing plate, and the other end is positioned to direct the spring and the parking brake cable, including its enlarged end to the guide and retention means of the actuating lever.

In either arrangement, it is preferred that the spring has one end thereof secured in the conduit assembly provided on the end of the parking brake cable assembly in the area where it may be located within and connected to the tube guide mounted through the backing plate opening. Thus the parking brake cable assembly includes the conduit assembly, the parking brake cable itself, the cable return spring and a parking brake cable enlarged end.

The operator will insert the parking brake cable assembly through the tube guide and move the cable and its enlarged end axially until the blind connection is completed. The operator may then pull back on the parking brake assembly to check that the connection is actually completed, feeling an appropriate resistance to such movement. The conduit assembly may then be snapped in position in the tube guide. In a preferred embodiment, the retention arrangement is also provided as a sealing arrangement which will prevent dirt, dust, water, etc. from entering the interior of the drum brake assembly through the backing plate opening provided for the parking brake cable assembly.

IN THE DRAWINGS

FIG. 1 is an elevation view of a drum brake assembly embodying the invention, with parts in section.

FIG. 2 is a view taken in the direction of arrows 2—2 of FIG. 1 showing one embodiment of the invention in cross-section with portions thereof in elevation.

FIG. 3 is fragmentary view similar to that of FIG. 1 illustrating a modification of the invention.

FIG. 4 is a fragmentary elevation view with parts broken away and in section, taken in the direction of arrows 4—4 of FIG. 3 and illustrating a portion of the blind assembly connection.

FIG. 5 is a view similar to FIG. 2, taken in the direction of arrows 5—5 of FIG. 3, and further illustrating the embodiment of the invention shown in that Figure.

FIG. 6 is a fragmentary cross-section view of a portion of the parking brake cable assembly of FIG. 5, with parts broken away, taken in the direction of arrows 6—6 of FIG. 5.

The drum brake assembly 10 of FIG. 1 includes a rotatable drum 12 having an internal drum friction surface 14. The assembly has a backing plate 16 on which is mounted a first brake shoe assembly 18 and a second brake shoe assembly 20 for movement into and out of engagement with the drum friction surface 14 for brake actuation and release, as is well known in the art. Shoe assemblies 18 and 20 respectively include shoes 22 and 24 respectively composed of a rim 26 and web a 28, and a rim 30 and a web 32. Shoe assembly 18 has a brake lining 34 secured to the rim 26, and shoe assembly 20 has a brake lining 36 secured to rim 30. The outer surface of the linings 34 and 36 provide lining friction surfaces which mate with the drum friction surface 14 during brake actuation. The shoe assemblies 18 and 20 respectively have upper shoe ends 38 and 40 and lower shoe ends 42 and 44. The upper shoe ends are arranged to be operatively engaged by pistons in the wheel cylinder 46 so that the shoe assembly may be hydraulically actuated for service brake operation. As is well known in the art, a suitable service brake operator such as a master cylinder provides hydraulic brake fluid under pressure to the wheel cylinder 46 to expand the pistons therein and move the shoe ends 38 and 40 apart so that the linings 34 and 36 are moved into braking engagement with the drum friction surface 14. In the particular brake assembly 10 illustrated, the brake shoe assemblies are arranged in a leading-trailing manner. Therefore the lower shoe ends 42 and 44 are positioned to engage a fixed anchor at the bottom of the assembly and axially opposite the wheel cylinder 46. The lower shoe ends are guided in position relative to the backing plate by the shoe retainer 48, and are continuously urged toward the anchor positioned between the shoe retainer and the backing plate 16 by the spring 50, as is well known in the art. It is to be understood that the drum brake assembly 10 may also be of other well known types such as the duo servo type. Although not shown, it is to be understood that a suitable brake shoe return spring is connected to the brake shoe rims 26 and 30 in the general area of the wheel cylinder 46 so as to continually urge the upper shoe ends 38 and 40 toward the retracted position. This arrangement is also well known in the art.

The brake assembly is illustrated as having a brake adjuster mechanism, which includes a spreader bar or strut 54, an adjuster wheel 56 and an adjuster lever 58, as is well known in the art. The spreader bar or strut 54 is typically provided in two pieces threadedly joined for adjusting purposes, also well known in the art. The strut 54 extends into recesses 60 and 62 respectively formed in brake shoe webs 28 and 32 near shoe ends 38 and 40 so as to be retained in proper position relative to the shoes. Since this particular brake assembly is one which also provides for mechanical parking brake actuation, the strut 54 acts as a mechanical spreader bar as is well known in the art.

The parking brake assembly, in addition to the use of strut 54 as a spreader bar, has a parking brake actuating lever 64 which has one end 66 pivotally mounted on the web 32 in a manner well known in the art. In this example, the web 32 is provided with an aperture 68 through which the lever end 66, bent so as to extend through the aperture 68, extends to provide a pivoting attachment. Lever 64 is also provided with a recess 70 which also receives one end of the spreader bar 54. Lever 64 extends downwardly immediately adjacent one side of web 32 on the side thereof opposite the backing plate 16, terminating in a lever lower end 72. As is well known in the art, when lever 64 is pivoted clockwise as seen in FIG. 1, it will act to move the spreader bar 54 against the brake shoe assembly 18, moving that assembly outwardly to engage the drum friction surface 14, with the lever reaction exerted through the lever end 66 and rim 30 at aperture 68 moving the brake shoe assembly 20 so that its lining also engages the drum friction surface 14. Thus the brake assembly is mechanically actuated for parking brake purposes, as is well known in the art.

The drum brake assembly 10 is provided with a parking brake cable assembly 74. Assembly 74 is illustrated as including a cable 76 mounted for axial movement in a cable sheath 78. As is better illustrated in FIG. 6, the sheath 78 terminates in a cable conduit assembly 80, while the cable 76 extends therebeyond inside the drum brake assembly as will be further described. As is well known in the art, the other end of cable 76 and sheath 78 are connected to a parking brake actuating mechanism such as a pedal assembly provided for ease of operation by the vehicle operator so that the cable 76 is tensioned when the pedal is actuated to actuate the parking brake mechanism. The parking brake cable assembly 74 also includes a spring 82 which is connected to the conduit assembly 80 at one end 84 about the portion of cable 76 which extends further into the drum brake assembly beyond the conduit assembly 80. As can be seen in the drawings, and as is well known in the art, the spring other end 86 is positioned for engagement with a portion of the lower end 72 of parking brake actuating lever 64. The end 88 of cable 76 is provided with an enlarged section or other element 90, commonly referred to as a button. Button 90 may be of the type illustrated in the above noted U.S. Pat. No. 3,064,787, or of any other suitable configuration. In the particular invention herein disclosed and claimed however, it is shaped in what may be characterized as a bullet-nosed configuration for better camming movement to be described.

A suitable tube guide 92 is secured in the opening 94 formed in the backing plate 16 through which the parking brake assembly is assembled. In the embodiment shown in FIGS. 1 and 2, the tube guide 92 terminates shortly after it passes through the opening 94 so that its terminus 96 is positioned in a laterally spaced relation to the parking brake actuating lever 64. When the short tube guide 92 is used, it is desirable to also provide a spring guide 98. Spring guide 98 is illustrated as being formed as a part of the shoe retainer 48, the spring guide portion extending upwardly from the point at which the retainer is mounted to the backing plate. The spring guide 98 may be substantially J-shaped in cross section, this configuration being evident in the perspective view thereof in FIG. 1. Thus the spring guide has an open passageway 100 extending therethrough. Passageway 100 is preferably slightly larger than the outer diameter of the spring 82 with one passageway end 102 being positioned in alignment with the terminus 96 of the tube guide 92. The passageway 100 is preferably slightly curved, as can be determined from the view in FIG. 2 of the spring guide 98, so that the other passageway end 104 is aligned with the lower end 72 of the brake actuating lever 64, and more particularly with the guide and retention member 106 formed thereon to be further described.

Guide and retention member 106 is preferably of a generally funnel shape with a large opening 108 at one funnel end and a smaller opening 112 at the other funnel end 114. The larger opening 108 faces generally toward the backing plate boss containing the opening 94 and the smaller opening 112 faces in the opposite direction. The member 106 has an inner surface 116 which acts as a camming guide surface for the button 90 as will be described. Inner surface 116 provides a camming guide surface of a non-linear ramp and therefore provides for non-linear contact with the button 90. Also inner surface 116 receives the spring 82 in a nonattached manner allowing for translational movement of the spring 82 and adjacent to the brake actuating lever 64. Inner surface 116 extends from the large funnel end 110 to the small funnel end 114. A slot 118, better seen in FIG. 4, is formed through a side of the guide and retention member 106 so that it joins the funnel end 110 and 114. The slot opens upwardly substantially toward the lever pivoted end 66. As is better seen in FIG. 4, The slot sides are also tapered due to the funnel or bell-like arrangement of the guide and retention member 106 so that the width of the slot near the larger funnel end 110 is greater than the width or diameter of the enlarged cable end 90 as well as the diameter of the cable 76. As is also best seen in FIG. 4, the large opening 108 is substantially larger in diameter than the diameter of the enlarged cable end or button 90, while the smaller opening 112 is smaller than the width or diameter of the enlarged cable end 90 and is only slightly larger than the diameter of the parking brake cable 76.

When the parking brake cable assembly, and particularly the parking brake cable section surrounded by spring 82 and having the enlarged end 90 formed thereon, is inserted through the backing plate opening 94 and tube guide 92 by substantially axial movement of the parking brake cable assembly, the spring 82 and the cable enlarged end 90 enter the passageway opening 102 of the spring guide 98 and are slightly deflected in their path by the curvature of the spring guide passageway 100 so that after they pass through that passageway and exit through the passageway other end 104, they are aimed substantially at the guide and retention member 106. Therefore, as they are axially moved further into the drum brake assembly, the button 90 passes into the guide and retention member larger opening 108 and engages the camming guide surface 116 formed by the inner surface thereof. At this time further axial movement of the cable 76 and its enlarged end 90 will result in a camming action between surface 116 and the outer surface of the enlarged cable end 90 so that the cable end is moved upwardly and passes through the slot 118 and therebeyond. Thus, shortly before the enlarged end 90 of the cable passes beyond the smaller end 114 of the guide and retention member 106, the enlarged end 90 is positioned beyond the slot while the portion of cable 76 immediately adjacent thereto extends through the slot.

Slight additional axial movement of the cable and its enlarged end will position the large end of the cable immediately beyond the smaller end 114 of the guide and retention member 106. Because of the cantilever-like biasing action of spring 82 tending to keep the spring in axial alignment between the spring guide 98 and the guide and retention member 106, the cable and its enlarged end having been moved laterally upward by this camming action, the cable enlarged end 90 will move downwardly as the cable portion immediately adjacent thereto drops back through the slot 118 so that the cable extends through the small funnel end 112, as is seen in FIG. 4, with the cable enlarged end or button 90 in axial alignment and engagement with the guide and retention member smaller end 114 as is shown in FIG. 2 as well as FIGS. 1, 3, 4 and 5. This completes the blind attachment of the cable to the parking brake actuating lever, the cable being in position so that when a tension force is applied thereto the force is transmitted to the parking brake actuating lever and will pivot that lever clockwise, as seen in FIG. 1, to mechanically apply the brake assembly. It will be noted that the spring end 86 will engage the guide and retention member 106 so as to continually urge the parking brake actuating lever 64 and cable 76 to the release position shown in FIG. 1.

When the assembler-operator has made the blind assembly to the extent above described, he may exert a tension force on the cable 76 by pulling on the conduit assembly 80 in the direction away from away from the backing plate and feeling the resistance to movement of the cable because of the connection to the parking brake actuating lever 64. Having satisfied himself that the connection has been made, he may then insert the conduit assembly 80 through the tube guide 92 so that the conduit assembly will be retained in the tube guide and sealed therein as shown in FIG. 6. This is described in detail below in relation to the elongated and curved tube guide which is illustrated in FIGS. 3, 5 and 6.

The modification of the invention illustrated in FIGS. 3–6 involves the tube guide and arrangements for guiding spring 82. The modified tube guide 192 is secured in the backing plate opening 94 in the same manner as tube guide 92 of FIGS. 1 and 2. However, instead of terminating near the boss through which opening 94 is formed, the tube guide extends in a curved manner from the laterally displaced position as it passes through the boss so that its end 196 is so aligned with the guide and retention member 106 that the spring 82, the cable 76, and the cable section enlarged end or button 90 are guided by the elongated and curved tube guide rather than requiring a separate spring guide as illustrated at 98 in FIGS. 1 and 2. Otherwise, the arrangement operates in the same manner as that described above.

FIG. 6 shows the manner of securing the conduit assembly 80 in to the tube guide 192 and also sealing the tube guide. This is accomplished by providing flanged groove 200 on the exterior of the conduit assembly 80 at the proper axial position and placing an O-ring 202 therein. The outer end 204 of the tube guide 192 (or tube guide 92 in FIGS. 1 and 2) is provided with an inwardly extending flange 204 which will let the O-ring 202 snap thereunder into position so that the O-ring cooperates with its groove side walls and the inner side wall of the flange 204 to retain the conduit assembly 80 in position, therefore also retaining the cable sheath 78 in the same axial position. Furthermore, O-ring 202 will seal against the tube guide inner surface as well as against the conduit assembly 80 so that water, dirt, dust, etc. cannot pass through the opening 94 in the backing plate.

The flange 204 has a lead-in ramp angle which displaces the rubber of the O-ring 202 during installation, and a more sharply angled retaining side wall on the inner side thereof which holds the O-ring in place once the cable conduit assembly 80 is pushed fully into position. If desired, the internal retaining angle of flange 204 may be made as a vertical wall which will cause the O-ring to shear before allowing the conduit assembly 80 to be removed.

When used in drum brakes with parking brake capability, both modifications support what would otherwise be somewhat laterally unstable cable return springs 82, preventing those springs from tending to buckle as the parking brake mechanism is actuated, giving an additional benefit of more direct spring forces being exerted for the return of the parking brake cable and the actuating lever to the released position illustrated in FIGS. 1 and 3.

The embodiments of the invention in which an exclusive property or privilege is claimed are defined as follows:

1. In an enclosed drum brake having a parking brake actuating lever and a flexible parking brake cable having no bent preformed shape, one end of said cable being connected to said lever with said enclosed drum brake for exerting tension parking brake actuating forces thereon to move said lever pivotally to actuate the drum brake, means including guiding means providing a blind assembly connection of said cable one end to said lever within said enclosed drum brake where an assembler has no access thereto to make such a connection, said last named means comprising:

an enlarged button on one said end of said cable shaped to provide a sliding cam action when slidably engaging a camming surface along which said button is movable;

a cable return spring surrounding said cable near said button and acting as a cable guide and cantilever-like support during the process of assembly connection;

a guide and retention member on said lever;

and means for guiding at least said cable and said button in substantially axial movement from a point of entry of said cable and said button into said enclosed drum brake to said guide and retention member, flexibility of said cable permitting said cable and said button to follow the guiding direction of said guiding means and the guiding direction of said guide and retention member;

said guide and retention member having a retention member surface and a camming guide surface positioned for camming engagement with said button as said cable and said button are first moved substantially axially from a first position spaced from said guide and retention member to a second position defined by the point of initial camming engagement of said button with said camming guide surface;

said camming guide surface being a non-linear ramp to provide non-linear contact with said button of said cable and said camming guide, and said camming guide surface receiving said spring in a non-attached manner allowing for translational movement of said spring, and said camming guide surface being shaped to guide and force said button and the adjacent portions of said cable and said spring translationally in a cantilever manner out of the axial movement path line of such first movement to side load said spring and said cable as said cable and button are further moved from said second position to a third position wherein said button is beyond said camming surface and out of engagement therewith, removing the camming surface action thereon;

said spring and cable thus having the side load removed therefrom and moving said cable, said spring and said button translationally back into said axial movement path line of said first movement and said button into tension retention engagement with said member retention surface, connecting said cable to said lever.

* * * * *